(12) United States Patent
Murdock

(10) Patent No.: US 7,535,964 B2
(45) Date of Patent: May 19, 2009

(54) SELF-CLOCKED TWO-LEVEL DIFFERENTIAL SIGNALING METHODS AND APPARATUS

(75) Inventor: Gary Steven Murdock, San Jose, CA (US)

(73) Assignee: Maxim Integrated Products, Inc., Sunnyvale, CA (US)

( * ) Notice: Subject to any disclaimer, the term of this patent is extended or adjusted under 35 U.S.C. 154(b) by 604 days.

(21) Appl. No.: 11/216,412

(22) Filed: Aug. 31, 2005

(65) Prior Publication Data

US 2007/0047663 A1 Mar. 1, 2007

(51) Int. Cl.
*H04L 25/00* (2006.01)

(52) U.S. Cl. ........................... 375/257; 375/258

(58) Field of Classification Search .............. 375/257, 375/258
See application file for complete search history.

(56) References Cited

U.S. PATENT DOCUMENTS

| | | | |
|---|---|---|---|
| 3,209,261 A | 9/1965 | Critchlow | |
| 3,434,059 A | 3/1969 | Kesolits | |
| 3,680,050 A | 7/1972 | Griffin | |
| 3,967,062 A | 6/1976 | Dobias | |
| 4,004,275 A | 1/1977 | Arndt et al. | |
| 4,015,204 A | 3/1977 | Miyazawa | |
| 4,253,185 A | 2/1981 | Danielsen | |
| 4,380,080 A | 4/1983 | Rattlingourd | |
| 4,475,212 A | 10/1984 | McLean et al. | |
| 4,627,073 A | 12/1986 | Shepperd et al. | |
| 4,791,407 A | 12/1988 | Prucnal et al. | |
| 4,876,697 A | 10/1989 | Whitfield | |
| 4,954,825 A | 9/1990 | Chi | |
| 5,086,435 A | 2/1992 | Studenberg | |
| 5,295,155 A | 3/1994 | Gersbach et al. | |
| 5,600,634 A | 2/1997 | Satoh et al. | |
| 5,625,645 A | 4/1997 | Greier et al. | |
| 5,712,875 A * | 1/1998 | Wooten | 375/257 |
| 5,721,755 A | 2/1998 | Kim et al. | |
| 5,872,813 A | 2/1999 | Hui | |
| 5,939,926 A * | 8/1999 | Uber | 327/382 |
| 6,295,323 B1 * | 9/2001 | Gabara | 375/257 |
| 6,317,469 B1 | 11/2001 | Herbert | |
| 6,327,308 B1 * | 12/2001 | Wooten | 375/257 |
| 6,346,832 B1 * | 2/2002 | Young | 327/108 |
| 6,519,302 B1 | 2/2003 | Bruce et al. | |
| 2003/0156655 A1 | 8/2003 | Hietala et al. | |
| 2005/0084021 A1 * | 4/2005 | Egan et al. | 375/257 |

\* cited by examiner

*Primary Examiner*—David C Payne
*Assistant Examiner*—Leon Flores
(74) *Attorney, Agent, or Firm*—Blakely Sokoloff Taylor & Zafman LLP

(57) ABSTRACT

Self-clocked two-level differential signaling methods and apparatus assuring both clock synchronization and ease of recovery of transmitted data. In accordance with the method, the data is encoded differentially on a differential signal that changes polarity at the end of each bit time. This allows clock recovery at the receiver simply by detection of the polarity change. The data is encoded, bit by bit, as exceeding a predetermined magnitude for a bit of a given state and as not exceeding the predetermined magnitude for the opposite state. Consequently data recovery is by way of a simple signal magnitude detection during a bit time, such as by a detection of signal magnitude a predetermined time. The apparatus does not require a phase locked loop in the receiver, thereby saving power and time to obtain synchronization. The method is conducive to varying bit time or duration, thereby reducing the peaks in the EMI radiation.

21 Claims, 1 Drawing Sheet

US 7,535,964 B2

SELF-CLOCKED TWO-LEVEL DIFFERENTIAL SIGNALING METHODS AND APPARATUS

BACKGROUND OF THE INVENTION

1. Field of the Invention

The present invention relates to the field of digital signal coding methods and apparatus.

2. Prior Art

Numerous signal coding techniques are well known for coding digital signals for transmission. Each coding technique typically has unique characteristics suitable for some applications, though perhaps not so desirable for other applications. By way of example, NRZ coding provides a very simple coding method, specifically, transmitting a signal for a first bit state and another signal for a second bit state. By way of example, NRZ coding usually codes a 0 by a low state signal and a 1 by a high state signal. The advantage of this coding is its simplicity, though a disadvantage is the fact that synchronization of the receiver takes special care if long strings of zeroes or ones are included in the transmission. Manchester coding, on the other hand, assures at least one transition per bit time, making synchronization of the receiver independent of long strings of zeroes or ones, though such coding has the disadvantage of having two transitions per bit time for strings of zeroes or ones, thereby requiring a wider band transmission medium for high speed communication. Both techniques generally require a phase locked loop (PLL) at the receiver for recovery and maintenance of the clock signal.

U.S. Pat. No. 6,317,469 discloses a method and apparatus for utilizing a data processing system for multi-level data communications providing self-clocking. That system uses single ended multiple voltage levels to represent different bit combinations and the clock signal, in the two embodiments disclosed in detail, different voltage levels (voltage ranges) represent the four possible combinations of two bits and a further voltage level or range to represent the clock signal. In one embodiment, a low voltage range represents the clock signal, a first voltage range above the clock signal represents the bit combination 00, a second voltage range above the first voltage range represents a bit combination of 01, a third voltage range above the second voltage range represents a bit combination of 10 and a voltage above the third voltage range represents a bit combination of 11. Thus for the transmission of two bits, the transmitted voltage increases to one of the applicable voltage ranges and then decreases into the clock signal voltage range before returning to the appropriate voltage range for transmission of the next two bit combination. In a second embodiment, the clock range is approximately mid-range, with separate voltage ranges for the same bit combinations above and as a mirror image below the clock voltage level. Here a single ended voltage swing upward to one of the voltage ranges above the clock range is indicative of the respective two bit combination, while a decrease through the clock voltage range to a lower voltage range is indicative of a following two bit combination. Accordingly, while in the first embodiment, the lower voltage range represented the clock signal, in this embodiment both the high and low voltage ranges provide two bit data combinations separated by a clock signal as the voltage passes through the clock signal range.

DETAILED DESCRIPTION OF THE PREFERRED EMBODIMENTS

Figure 1:
FIG. 1 illustrates the two singled-ended signals that make up the differential signal of one embodiment of the present invention.

In the preferred embodiment of the present invention, a differential signaling technique is used. In particular, as may be seen in FIG. 1, a differential signal is provided which changes polarity each bit time to automatically provide the desired bit clock. In addition, between each change in polarity, the signal at the receiver is compared with a reference, and if higher than the reference, is interpreted as a 1. A zero, on the other hand, is in essence an absence of a 1, that is, a signal at the receiver that fails to reach the reference level. The signal itself may be a differential voltage or a differential current, dependent on the implementation used.

Figure 2:
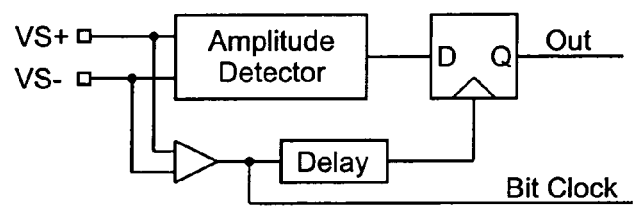
FIG. 2 schematically illustrates one implementation for data and clock recovery in a receiver.

One of the advantages of the present invention is that clock and data recovery does not require a phase locked loop in the receiver, thereby reducing power and reducing time to synchronization. In particular, data recovery may be achieved by an implementation such as that of FIG. 2. As shown in that Figure, an amplitude detector may be used to detect the absolute magnitude of the differential signal. If it reaches a predetermined value, it would be interpreted as a first digital value, typically a 1, and if the voltage did not reach the predetermined value, it would be interpreted as not being the first digital value, and thus being the second digital value, typically a 0. A comparator senses the zero crossing between each bit time, triggering a delay circuit on each zero crossing. After a delay of a fraction of a bit time to allow the output of the amplitude detector to settle, the delay circuit clocks the D flip-flop to clock the D input to the Q output. Then on the next zero crossing at the end of the bit time, a new input is provided to the amplitude detector. Also the output of the comparator sensing each zero crossing may be used as a bit clock to clock some further circuitry receiving the output of the D flip flop, bit by bit, as set during the prior bit time. Alternatively, the output of the delay circuit may be used to derive a bit clock signal for further circuitry.

As a further alternative, the amplitude detector may be designed to temporarily hold or latch a high level when the input exceeds the reference level during the bit time, and to hold or latch a low level when the input did not exceed the reference level, with the respective level being clocked into the flip-flop on the zero crossing at the end of the respective bit time and the self latched amplitude detector is reset. In that regard, a flip-flop may clock in an input very quickly, so that the holding or latch period may be quite short. The amplitude detector and the flop-flop may be designed for the output of the amplitude detector to be clocked into the flip-flop before a change in input to the amplitude detector on a new zero crossing causes the output of the amplitude detector to change. A block diagram for a circuit for doing this could be the same as that of FIG. 2, but without the intentional delay. Now the bit clock slightly precedes the respective bit appearing on the output of the Flip-flop.

It should be noted, as stated before, that the detected amplitude or magnitude of a signal may be a current or a voltage. However the detected magnitude of a signal may take other forms also. By way of example, the detected magnitude of a signal may also be the peak voltage or peak current reached at any time during the bit time, or reached during a fraction of the bit time, or may be the magnitude of an average voltage or average current during the bit time or a fraction of the bit time, or some other measure of the magnitude of a signal.

One of the advantages of the present invention is its low power requirement. This is particularly true when communication is not continuous, but rather is in bursts. This is because not only is a phase looked loop not used in the receiver, thereby saving the substantial power consumed by a phase locked loop, but also the bit synchronization is substantially immediate and data word (plurality of data bits set off from other data words by sync or reference bits) synchronization is itself achieved typically in a transmission time of one data word plus one or two sync bits.

Further, because clock recovery is automatic, the receiver is very jitter tolerant. In fact, EMI may be suppressed by intentionally varying the bit times, by "frequency spreading" or "frequency hopping", thereby spreading the EMI over a frequency range and generally lowering what would have been the higher peaks in the EMI. This may be done by varying the bit times (frequency) in linear or a random (or pseudorandom) manner, typically over a predetermined frequency range. If a pseudorandom variation is used, it is possible to select the variation so that the average transmission time for each or each fixed plurality of data words is constant, should the receiver need a uniform data stream for proper operation. In that regard, a data word may be a single byte, a plurality of bytes, or some number of bytes not making up an integer number of bytes. Typically the percentage variation in the bit times will not be so large as to prevent the use of a fixed delay in the Circuit of FIG. 2.

Figure 3:
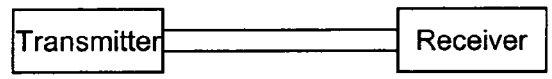
FIG. 3 is a block diagram schematically illustrating one communication system in accordance with the present invention.
Figure 4:
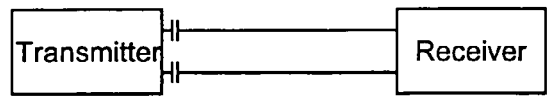
FIG. 4 is a block diagram schematically illustrating another communication system with capacitor coupling in accordance with the present invention.

A typical communication system using the present invention may use a two-wire connection between the transmitter and the receiver, as shown in FIG. 3. By way of example, the two-wire connection may be a twisted or an untwisted pair, or two wires of a larger ribbon cable. Also, AC coupling may be used if desired, as illustrated in FIG. 4. While the data rate typically will be substantial, the communication system in fact enables a simple wideband deserializer (receiver) accepting sub-bit-per-second to gigabit-per-second data rates. Also communication distances may vary considerably, application to application. By way of example, one embodiment of the present invention is intended as a high speed serial link in flip-type cell phones to provide simple, fast, reliable and low power communication using wiring routed through the hinge, thereby reducing the number of wires required. Other embodiments are intended for use in vehicles, while still other embodiments could be used for longer communication distances.

Thus while certain preferred embodiments of the present invention have been disclosed and described herein for purposes of illustration and not for purposes of limitation, it will be understood by those skilled in the art that various changes in form and detail may be made therein without departing from the spirit and scope of the invention.

What is claimed is:

1. A method of communication from a first digital device to a second digital device comprising:

transmitting over a pair of wires a differential signal from the first digital device, the differential signal changing polarity between each successive bit time, the differential signal having a magnitude, independent of phase, during each bit time exceeding a predetermined value when transmitting a bit of a first state and not exceeding the predetermined value when transmitting a bit of a second state;

receiving from the pair of wires the differential signal by the second digital device;

sensing each change in polarity of the differential signal; and, between each change in polarity, determining when the magnitude of the differential signal exceeds the predetermined value, and outputting a bit of a first state when the differential signal has a magnitude exceeding the predetermined value and outputting a bit of a second state when the differential signal does not have an magnitude exceeding the predetermined value.

2. The method of claim 1 wherein determining when the magnitude of the differential signal exceeds the predetermined value after each change in polarity comprises determining when the magnitude of the differential signal exceeds the predetermined value a predetermined time after each change in polarity.

3. The method of claim 1 wherein between each change in polarity, determining when the magnitude of the differential signal exceeds the predetermined value further comprises retaining a result of that determination during the next change in polarity until outputting a bit of the first or second state.

4. The method of claim 1 wherein the length of each bit time is fixed.

5. The method of claim 1 wherein the lengths of bit times vary.

6. The method of claim 1 wherein the lengths of bit times vary in a random manner.

7. The method of claim 1 wherein the lengths of bit times vary in a pseudorandom manner.

8. The method of claim 1 wherein the lengths of bit times vary in a linear manner.

9. The method of claim 1 wherein the lengths of bit times vary, and each predetermined plurality of bits comprise a data word, and wherein the average time period for an integer number of data words is fixed.

10. The method of claim 9 wherein the integer number of data words is one.

11. The method of claim 9 wherein a data word comprises a predetermined integer number of bytes.

12. The method of claim 1 wherein the differential signal is a differential current signal.

13. The method of claim 12 wherein the magnitude of the differential current signal comprises an average magnitude of the differential current signal.

14. The method of claim 1 wherein the differential signal is a differential voltage signal.

15. The method of claim 14 wherein the magnitude of the differential voltage signal comprises an average magnitude of the differential voltage signal.

16. The method of claim 1 wherein each change in polarity is used to provide a bit clock for clocking each output bit into further circuitry.

17. A method of communication from a first digital device to a second digital device comprising:

transmitting over a pair of wires a differential signal from the first digital device, the differential signal changing polarity between each successive bit time, and having a magnitude, independent of phase, during each bit time exceeding a predetermined value when transmitting a bit of a first state and not exceeding the predetermined value when transmitting a bit of a second state;

receiving from the pair of wires the differential signal by the second digital device;

sensing each change in polarity of the differential signal; and, after a fraction of a bit time after each change in polarity, determining when the magnitude of the differential signal exceeds the predetermined value, and outputting a bit of a first state when the differential signal has an magnitude exceeding the predetermined value and outputting a bit of a second state when the differential signal does not have an magnitude exceeding the predetermined value.

18. The method of claim 17 wherein each change in polarity is used to provide a bit clock for clocking each output hit into further circuitry.

19. A method of communication from a first digital device to a second digital device comprising:

transmitting over a pair of wires a differential signal from the first digital device, the differential signal changing polarity between each successive bit time, and having a magnitude, independent of phase, during each bit time exceeding a predetermined value when transmitting a bit of a first state and not exceeding the predetermined value when transmitting a bit of a second state;

receiving from the pair of wires the differential signal by the second digital device;

sensing each change in polarity of the differential signal; and, between each change in polarity, determining when the magnitude of the differential signal exceeds the predetermined value, and on the next change in polarity of the differential signal, outputting a bit of a first state when the differential signal for the prior bit time had an magnitude exceeding the predetermined value and outputting a bit of a second state when the differential signal for the prior bit time did not have an magnitude exceeding the predetermined value.

20. The method of claim 19 wherein the result of determining when the magnitude of the differential signal exceeds the predetermined value during a bit time is retained on each change in polarity until outputting the respective bit.

21. The method of claim 19 wherein each change in polarity is used to provide a bit clock for clocking each output bit into further circuitry.

* * * * *